US007389219B2

(12) United States Patent  
Loisey et al.

(10) Patent No.: US 7,389,219 B2
(45) Date of Patent: Jun. 17, 2008

(54) PROVISIONING COMPUTING SERVICES VIA AN ON-LINE NETWORKED COMPUTING ENVIRONMENT

(75) Inventors: Christophe Loisey, Seattle, WA (US); Regis Denefle, Seattle, WA (US); Mark E. McDaniel, Kent, WA (US); William Jason Bell, Redmond, WA (US); Jeff Case, Seattle, WA (US); Casey John Jacobs, Arlington, WA (US); Ralph Abdo, Montreal (CA)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 11/301,639

(22) Filed: Dec. 13, 2005

(65) Prior Publication Data

US 2006/0167674 A1   Jul. 27, 2006

Related U.S. Application Data

(63) Continuation of application No. 09/804,979, filed on Mar. 13, 2001, now Pat. No. 6,999,912.

(51) Int. Cl.
G06F 9/455      (2006.01)
(52) U.S. Cl. .......................................... 703/23; 703/24
(58) Field of Classification Search ................... 703/21, 703/23, 24; 709/203, 220
See application file for complete search history.

(56) References Cited

U.S. PATENT DOCUMENTS 6,195,650 B1   2/2001   Gaither et al. ................. 707/1
6,327,608 B1   12/2001  Dillingham ................. 709/203

(Continued)

FOREIGN PATENT DOCUMENTS

EP        0 878 759 A1   11/1998

(Continued)

OTHER PUBLICATIONS

MSDN Library Archive. "Microsoft Windows NT Hydra: The Benefits of Windows with the Low Cost of a Terminal." Jul. 1997. http://msdn.microsoft.com/archive/en-us/dnarwts/html/msdn_hydrawp.asp?frame=true.*

(Continued)

*Primary Examiner*—Paul L Rodriguez
*Assistant Examiner*—Luke Osborne
(74) *Attorney, Agent, or Firm*—Merchant & Gould

(57) ABSTRACT

A system and method for allowing user access to software applications, data storage and retrieval, and electronic mail and messaging services in a networked computing environment are provided. The need for software installation, upgrade, and version control, and the need for certain hardware upgrades are eliminated by providing software and data storage and retrieval to a user or to groups of users from a remote terminal server via a networked computing environment. Software applications, data and electronic mail and messaging services are stored, maintained and operated at a remote terminal server and are provided to the user over the Internet or over an intranet of an organization such as a company or educational institution. Data is stored and secured at a remote file server, and web operations are provided by a remote web server. The backend of the system, including the terminal servers, file servers and web servers is managed and secured by a domain controller.

20 Claims, 4 Drawing Sheets

U.S. PATENT DOCUMENTS

2003/0061323 A1* 3/2003 East et al. .................. 709/223
2003/0191799 A1* 10/2003 Araujo et al. ............... 709/203

FOREIGN PATENT DOCUMENTS

WO      WO 99/63430      12/1999

OTHER PUBLICATIONS

Tristan Richardson et al., The Olivetti & Oracle Research Laboratory, "Virtual Network Computing", Jan. & Feb. 1998, XP-002287085, http://computer.org/internet.

Mike Fratto, Network Computing Online, "Remote Control: Let Your Browser Do The Walking", Mar. 9, 1998, XP-002076443, http://www.nwc.com/901/901ws2.html.

Jerry Golick, Mixed Medi, "Network Computing in the New Thin-Client Age", Mar. 1999, XP-002205538.

Helmig, Johannes Administration Via Remote Control (NetMeeting):, Dec. 2, 2000, http://www.won.com/pages/article_p.asp?id=62.

Microsoft Windows NetMeeting web Site, "Work from home", Jun. 8, 1999, http://www.Microsoft.com/windows/NetMeeting/Home/DeskShare/default.asp.

"NetMeeting for Remote Assistance", last update: Jan. 1, 2003, http://www.Ipt.com/windoesnetworking/regusers/netmeet.htm.

"Chapter 6: Using NetMeeting on Intranet Web Pages", last updated: Jan. 3, 2003, http://www.Microsoft.com/windows/NetMeeting/Corp/reskit/Chapter6/default.asp.

Microsoft Knowledge Base Article—233175, "How to Use Remote DesktopSharing in NetMeeting", last reviewed: Dec. 6, 2003, Info in article applies to Microsoft NetMeeting 3.01 for Windows 95.

Windows NetMeeting, "Remote Desktop Sharing", last updated: Jun. 4, 1999, http://www.Microsoft.com/windows/netmeeting/features/rds/default.asp.

Helmig, J., "Remote Access or Remote Control (pcAnyWhere)", Dec. 6, 1997, http://wown.com/pages/article_p.asp?id=100.

"Remote Computer System Support: Especially of Parents", last revised: Feb. 1, 2002, http://www.faughan.com/remoteSupport.html.

Hiner, J. "Radmin brings robust remote administration to Windows NT/2000", TechRepublic Magazine, Dec. 5, 2000, http://techrepublic.com.com/5100-6268-5028103.html.

Hiner, Jr. Radmin's tools simplify remote administration of Windows NT/2000, Dec. 7, 2000, http://techrepublic.com.com/5100-6268-1053770.html.

Seltzer, L., "Remote Control Administration for Windows NT Server 4.0", May 2000, Network Windows Magazine, http://www.winnetmag.com/Articles/ArticleID/8463/pp/7/7.html.

Anand, R., et al. "A Flexible Model for Using Internet Content", Proc. of the 16th Symposium on Reliable Distributed Systems, Oct. 1997, pp. 89-96.

* cited by examiner

PROVISIONING COMPUTING SERVICES VIA AN ON-LINE NETWORKED COMPUTING ENVIRONMENT

RELATED APPLICATIONS

This application is a Continuation of U.S. patent application Ser. No. 09/804,979, filed on Mar. 13, 2001, which is incorporated by reference herein in its entirety.

TECHNICAL FIELD

The present invention generally relates to networked computing. More particularly, the present invention relates to providing user access to software applications, data storage and retrieval, electronic mail and messaging, operating system functionality, and the like over an Internet-based or intranet-based networked computing environment.

BACKGROUND OF THE INVENTION

In recent years, the use of computers in all aspects of business, education, entertainment, and the like, has increased dramatically. A high demand has followed for more advanced and efficient computer hardware and software. It is often the case that home or small business computer users must update their computer operating systems to handle new software, only to find that the computer lacks sufficient memory capacity for the new operating system and software. Equally problematic, the computer user often finds that their computer lacks sufficient memory to store the very data generated or manipulated by the desired operating system or software.

For example, say the user is an individual home computer user. The user has a variety of software applications loaded on her home computer. The user stores and retrieves data on her computer, and the user uses electronic mail and messaging services through software stored on her computer. If a new version of the user's software is developed, or if an upgrade is developed by the manufacturer of the software to enhance performance or functionality or to solve a problem with a previous version, the user must obtain the new version and load it on to her computer. If the user's computer lacks sufficient memory, or if the user's operating system is incompatible or insufficient, the user may have difficulty. The user may be required to upgrade the memory and the operating system on her computer. Even if the user's computer has sufficient memory capacity and hardware to enable the user to upgrade the user's computer operating system or software applications, often the user's computer lacks sufficient memory to store and retrieve the very data the user desires to enter, store and manipulate with the user's computer. For on-line services, computer users are required to select an on-line service provider and insure that their computer hardware and software will handle the demands of the on-line computing.

Organizations of varying size, such as companies and educational institutions have similar technical concerns, but on a broader scale. Some organizations operate hundreds or even thousands of individual computers networked to each other via an intranet operated and administered by the organization. Such organizations typically require the expenditure of significant resources for information technology personnel and for maintaining data storage, back-up of data storage, software installation and upgrade, and hardware upgrade to enable software upgrade and data storage. System failures often occur in numerous locations throughout the organization requiring the dispersal of limited resources and time.

A major problem for such organizations attempting to implement application services has been the tremendous cost of the learning curve for operations personnel. Computing operations personnel typically must become familiar with all the intricacies of software application products before the products may be deployed on the organization's computer system. Answers to technical problems often are spread among several sources with no central location or source to draw from. All users, including individuals and organizations and organizations must maintain security over data and valuable software.

It is with respect to these considerations and others that the present invention has been made.

SUMMARY OF THE INVENTION

In accordance with the present invention, the above-identified problems are solved by a system and method for providing computer user access to computing services, including operating systems, software applications, data storage and retrieval, electronic mail and messaging services, and data and software security in an on-line networked computing environment. The need for software installation, upgrade, and version control, and the need for certain hardware upgrades are eliminated by providing software and data storage and retrieval to a user or to groups of users from a remote terminal server via a networked computing environment. Software applications, data and electronic mail and messaging services are linked to, stored, maintained and operated within a remote terminal server in combination with a file server, other terminal servers, and domain controllers, and are provided to the user over the Internet or over an intranet of an organization such as a company or educational institution. Data is stored and secured at a remote file server, and web operations are provided by a remote web server. The backend of the system, including the terminal servers, file servers and web servers is managed and secured by a domain controller.

More particularly, a method and system for providing computing services in a networked computing environment are provided. A computing device, such as a personal computer operated by a user, is provided with a software module from a remote computing device, such as a terminal server, for allowing exchange of data between the computing device and the remote computing device (terminal server). Through the software module, an emulation of an operating system of the remote computing device is provided to the user's computer. Additionally, through the software module an emulation of the user's computer desktop configuration is passed from the remote computing device to the user's computing device. Preferably, the software module is an ActiveX control.

Actions such as keyboard strokes, mouse movements and mouse clicks at the user's computer are monitored by the operating system of the remote computing device. In response to the actions at the user's computer, the emulation of the operating system and desktop configuration provided to the user's computer is updated.

Preferably, the remote computing device includes a number of components including a terminal server, a file server, a web server, and a domain controller. The user's computer is preferably connected to the remote computing devices via a networked computing environment through the Internet or through an intranet.

In accordance with another aspect of the invention, software applications may be provided to the user's computer from one or more of the remote computing devices, such as a terminal server. Additionally, data entered at the user's computer may be stored on and retrieved from a remote device, such as the file server. Internet and web services may be provided to the user's computer via the remote web server. Preferably, the software and hardware components of the networked computing environment are managed and secured by the domain controller.

The methods may be implemented as a computer process, a computer system or as an article of manufacture, such as a computer program product or computer readable medium. The computer program product may be a computer storage media readable by a computer system and encoding a computer program for instructions for executing a computer process. The computer program product may also be a propagated signal on a carrier readable by a computer system and encoding a computer program of instructions for executing a computer process.

These and other features and advantages, which characterize the current invention, will be apparent from a reading of the following detailed description and a review of the associated drawings. It is to be understood that both the foregoing general description and the following detailed description are exemplary only and are not restrictive of the invention as claimed.

DETAILED DESCRIPTION OF THE INVENTION

The present invention provides user access to software applications, data storage and retrieval, and electronic mail and messaging services in a networked computing environment. According to an exemplary embodiment of the present invention, software installation, upgrade, and version control, and certain hardware upgrades are eliminated at the user level by providing software and data storage and retrieval to a user or groups of users from a remote terminal server via a networked computing environment. According to the present invention, a virtual operating system, software applications, data and electronic mail and messaging services are stored, maintained and operated at a remote terminal server and are provided to the user over the Internet or over the intranet of an organization such as a company or educational institution.

Figure 1:
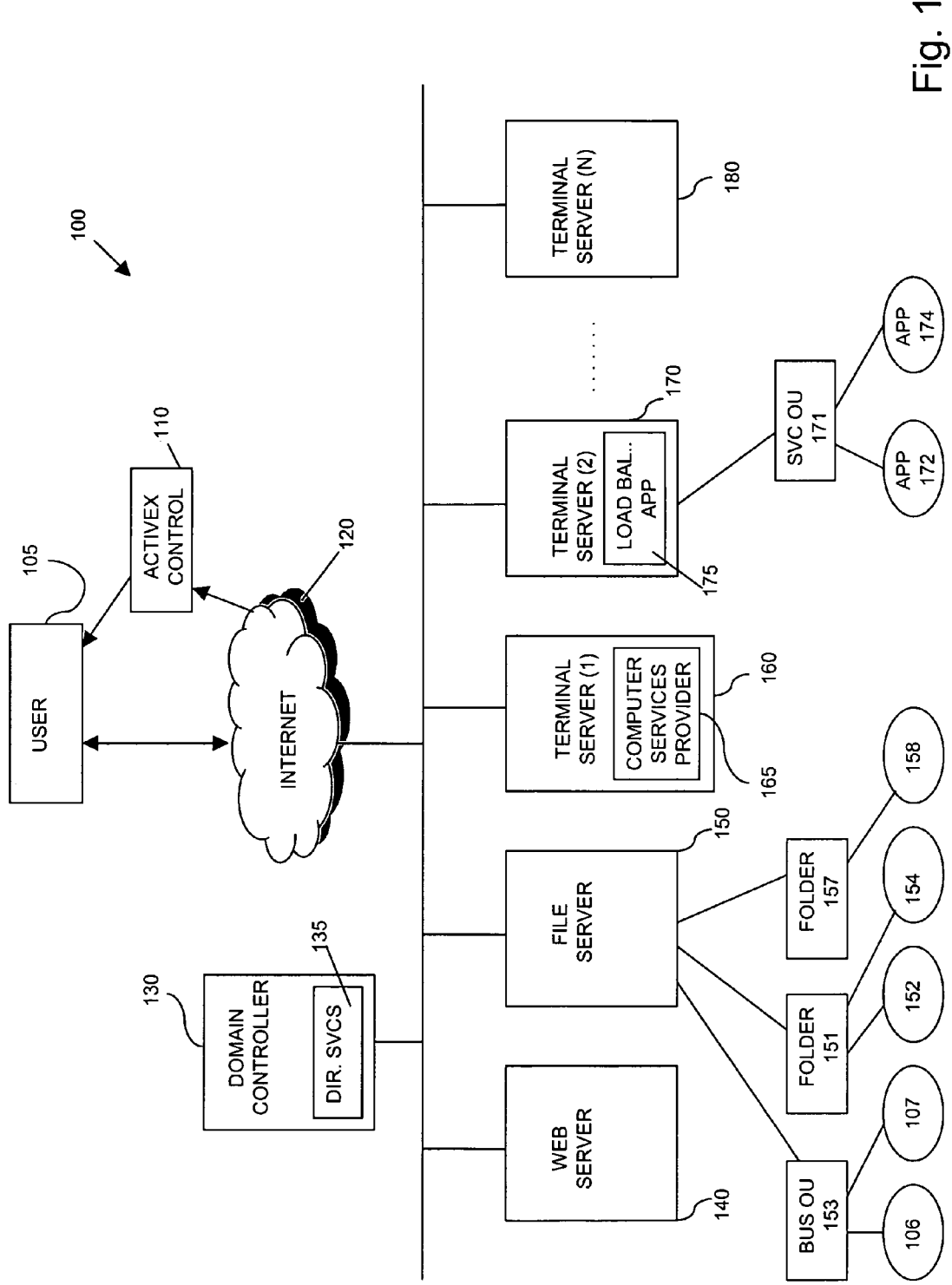
FIG. 1 illustrates interaction between a computer user and the components of a distributed networked computing environment.

Referring now to FIG. 1, according to an exemplary embodiment of the present invention, computing services including provision of operating system functionality, software applications and upgrades, on-line services, and data storage and retrieval are provided to a user 105 via a networked computing operating environment 100. The user 105, using a computing device, such as a computer 20, described below, logs on to an Internet or intranet based services site of a computing application and data service provider at a terminal server 160 via the Internet 120. The user 105 needs only have an Internet browser to connect to the networked computing environment 100 and the services of the computer services provider 165. For purposes of this description, the user 105 may be defined as a single user, a plurality of users, a group of users, or an organization, such as a company or other institution. The computer services provider 165 may be any person or organization that provides computing services and who would like to make those services available to users in accordance with the present invention. Exemplary computer services providers 165 may include software providers, Internet service providers, database and file storage providers, and the like. According to an exemplary embodiment of the present invention, once the user 105 is connected to the services provider 165, all computing services necessary for the efficient and the productive use by the user are provided from remote computing devices, including remote terminal servers, file servers, web servers and domain controllers.

The remote terminal services include a number of terminal servers 160, 170, 180 for providing software applications and remote desktop functionality and display. A file server 150 is provided for remotely maintaining user data and individual and organization user profile information. A web server 140 provides online services and electronic mail and messaging services. A domain controller 130 provides directory services, security, and general management of clusters of network components such as terminal servers 160, 170, 180.

Under the present invention, the user's individual computer or the organization's network of computers serve as client machines in the networked computing environment 100. That is, once the user or users log onto the services of the computing services provider via the Internet 120, the user's machine is provided an emulation of the terminal server computer operating system, and the user's desired computer desktop settings are displayed to the user regardless of when the user logs on, from where the user logs on, or from which computer the user logs on. All software applications utilized by the user are stored, maintained, and upgraded at a remote terminal server 160, 170, 180 which eliminates the need for software purchase, download, or upgrade by the user on the user's local computer.

Data entered, stored, and manipulated by the user is maintained on a remote file server 150 that eliminates the need for the user to back up, secure, and provide adequate memory capacity for the user's data. Online services and electronic mail and messaging services are provided to the user via a terminal server session in combination with a remote web server 140 via the Internet. And, all the aforementioned services are secured and managed by the computing services provider 165 selected by the user via the domain controller 130 which oversees operation of the networked computing environment 100, described herein. According to an alternative embodiment, these services may be secured and managed by a management server. An exemplary management server is Proxy Server produced by Microsoft Corporation of Redmond, Wash. The Proxy Server allows users in the networked computing environment 100, such as computer services providers 165, to extend their services to the Internet while managing security, cost, firewall services, data caching, and services management.

Figure 2:
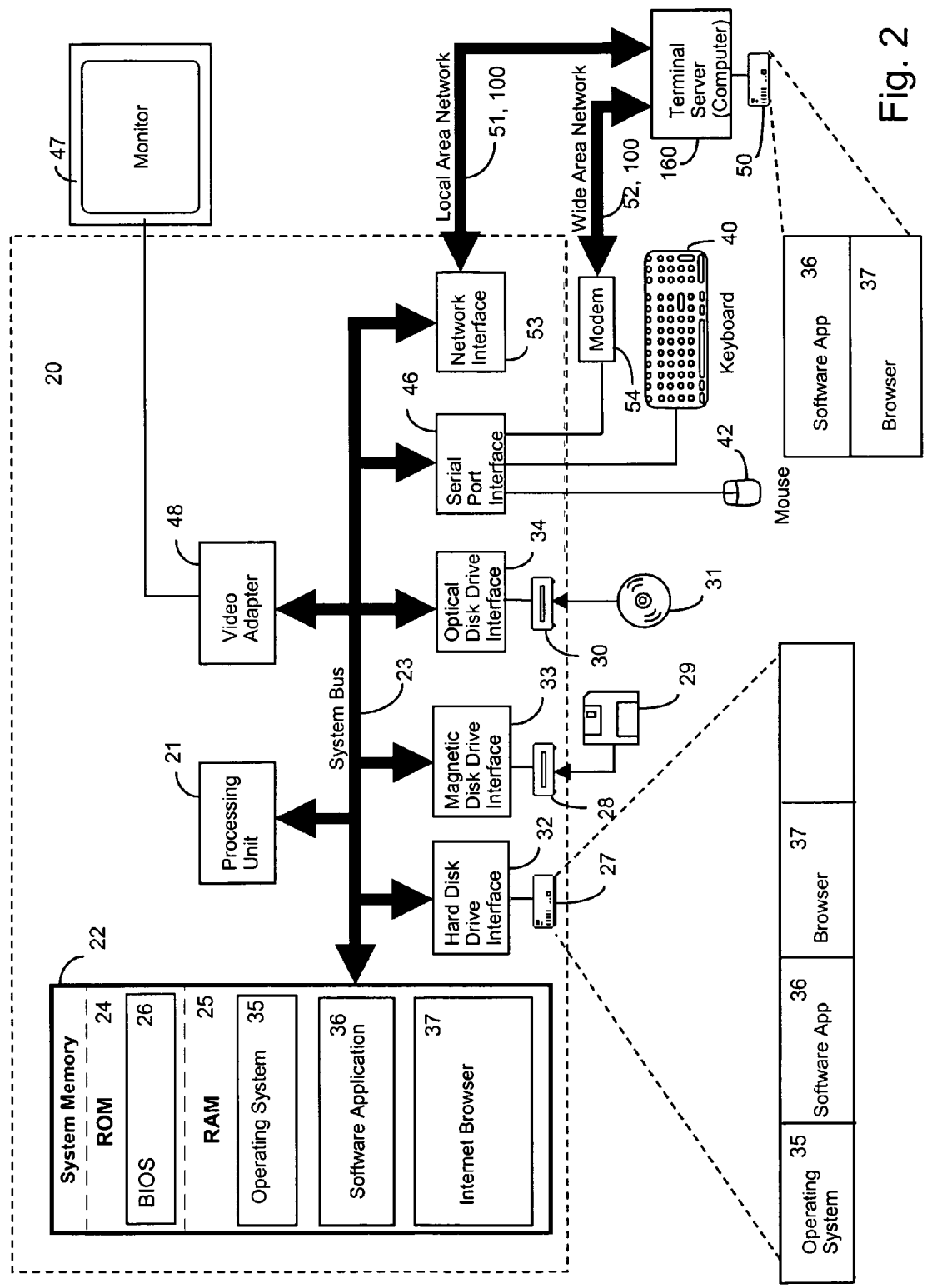
FIG. 2 illustrates a computer system that provides an operating environment for an exemplary embodiment of the present invention.

FIG. 2 and the following discussion are intended to provide a brief, general description of a suitable computing environment in which the invention may be implemented. The invention is described in the general context of a distributed computing environment where tasks are performed by remote processing devices that are linked through a communications network. In a distributed computing environment, program modules may be located in both local and remote memory storage devices. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

With reference to FIG. 2, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, a software application 36, and an Internet browser 37. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as the terminal servers 160, 170, 180. The remote terminal server 160, 170, 180 may be a computer, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. According to an exemplary embodiment of the present invention, the networked computing environment 100 may operate as part of a LAN 51 or a WAN 52.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device, such as the terminal servers 160, 170, 180. It will be appreciated that the network connections shown are exemplary and other means of establishing a communications link between the computers may be used.

Computing devices, such as personal computer 20, typically include at least some form of computer readable media. Computer readable media can be any available media that can be accessed by personal computer 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 20.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

Figure 3:
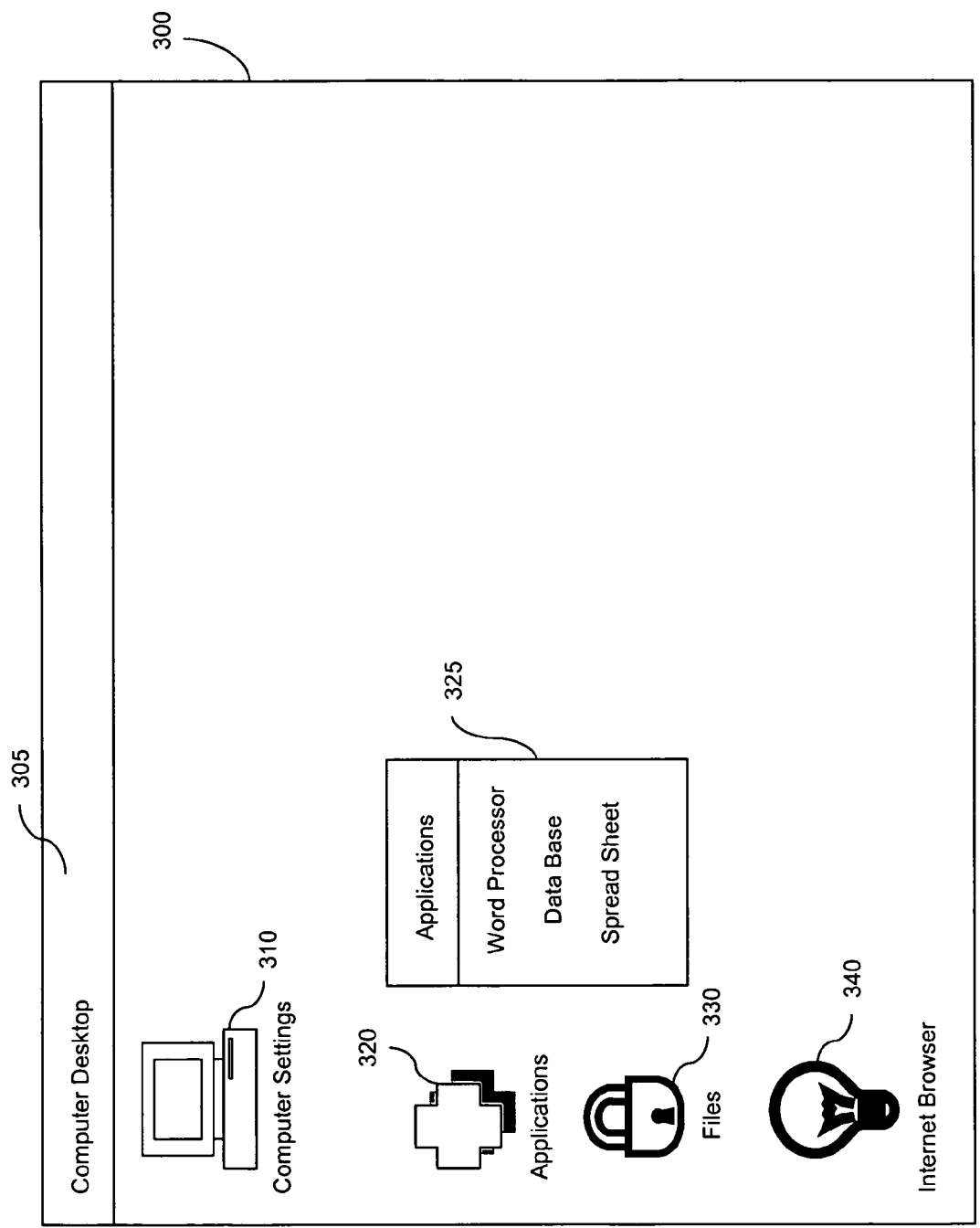
FIG. 3 illustrates a screen display of a computer generated user interface window showing exemplary icons and controls.
Figure 4:
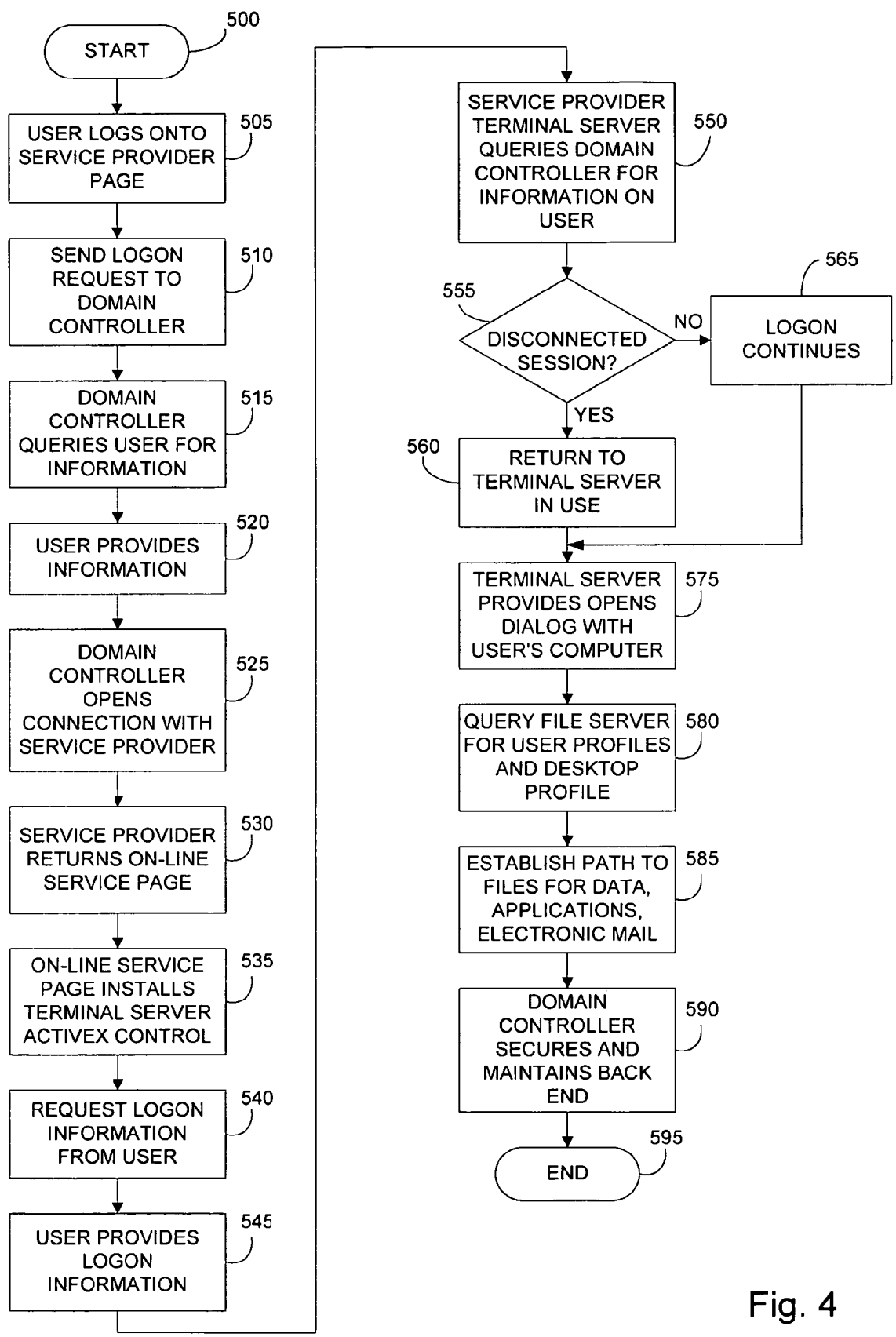
FIG. 4 illustrates an operational flow of the steps performed by the system of the present invention in providing computing services to users and groups of users in a distributed networked computing environment.

FIG. 3 illustrates an exemplary screen display of a computer generated user interface window showing exemplary icons and controls. As set forth above, in accordance with an exemplary embodiment of the present invention, use of the functionality of the present invention begins by the user logging on to the services of the computing services provider through an Internet browser program 37 maintained on the user's computer 20. An exemplary Internet browser program 37 includes Internet Explorer, manufactured by Microsoft Corporation of Redmond, Wash. The first time the user attempts to log onto the services of the computing services provider, the user requests a user account from the system administrator of the computing services provider selected by the user. The user provides personal profile information and obtains a password or other authentication/identification number of code. Once the user's authority to log onto the services of the computing services provider 165 selected by the user is authenticated, a reusable software module is passed to the user's computer 20 that in turn establishes an online terminal server session between the user 105 and the computing services provider 165 resident at the terminal server 160. According to an exemplary embodiment, the reusable software component is an ActiveX control 110.

The ActiveX control 110 installed on the user's computer 20 via the user's Internet services browser 37, provides for a desktop emulation of the computer operating system provided by the computing services provider 165 and provides for interaction between the user's computer 20 and hardware and software components of the networked computing environment 100. As is known to those skilled in the art, an ActiveX control is a reusable software component that may be used for interactivity between software components in a networked computing environment regardless of the language in which the components were created. ActiveX controls may be embedded in Internet based web pages to produce interactive applications, data objects and whole software applications. Once the terminal server session is established between the user 105 and the terminal server 160, the user's computer 20 will act as a client to the terminal server 160 through the ActiveX control.

The operating system functionality, desktop presentation and access to software, data and electronic mail and messaging come through the terminal server 160. The user's experience appears as though the user is operating on the terminal server 160 itself. The terminal server 160, through the ActiveX control, monitors user actions on the user's computer 20, including keystrokes, mouse movement etc. In response to those user actions, the terminal server 160, through the ActiveX control, sends the user an emulation of the desktop of the user's computer 20 and provides the user with a display on the user's computer screen that is responsive to user actions. All actual manipulation of data and operating system and software activity occurs on the terminal server 160. According to an exemplary embodiment of the present invention, the emulation of desktop presentation, operating system functionality, and the display on the user's computer of software application functionality and data is accomplished by sending to the user's computer 20, through the ActiveX control, bitmaps representing the appropriate and expected display on the computer 20. In short, the user's computer 20 imitates the functionality of the operating system, software applications and data operating at the terminal server 160 on behalf of the user 105.

Once the user is connected to the remote services of the computing services provider 165, the ActiveX control installed in the user's computer 20, described above, provides the user access to and services of a remote computer operating system maintained by the computer services provider 165. Additionally, the user is provided with remote desktop protocol functionality that displays to the user the user's personally defined desktop such as the desktop window 300 illustrated in FIG. 3. In accordance with an exemplary embodiment of the present invention, the desktop window 300 is an emulation of the user's desktop profile stored and maintained by the computer services provider 165.

The desktop window 300, illustrated in FIG. 3, contains exemplary icons including the computer settings icon 310, applications icon 320, files icon 330 and the Internet browser icon 340. The exemplary desktop window 300 also contains an applications window 325. According to the present invention, the user 105 sets her desktop configuration as desired by placing desired icons on the desktop and by configuring menus such as the applications window 325 according to the particular needs and desires of the user 105.

Under the present invention, once the user establishes a desired desktop windows 300 presentation, as illustrated in FIG. 3, that desktop configuration is stored by the computer services provider 165 on the file server 150. Each time the user logs onto the networked computing environment 100 via the computer services provider 165, the ActiveX control installed on the user's computer 20, as described above, causes the user's computer 20 to display the user's personally configured desktop window 300 as illustrated in FIG. 3. That is, any time the user logs onto the services of the computer services provider 165 from any location, and from any computer, the user's computing experience will be identical.

The user's personally configured desktop window 300 is provided to the user with each icon or other graphical user interface in the same position, color setting, and size set by the user. When the user selects applications for use on the user's computer 20, those applications selected by the user for provision by the computer services provider 165 are made available to the user at the user's computer 20 via the networked computing environment 100.

When the user stores, retrieves, and manipulates data on the user's computer 20, all data storage and retrieval will be stored to and retrieved from a remote file server 150 operated, maintained and secured by the computing services provider 165. Any time an application used by the user 105, in accordance with the present invention, is updated or repaired, the new version, updated or repaired version will be installed and maintained by the computer services provider 165 on the terminal server 160, 170, 180. The user will have no need to purchase new software or update existing software or repair existing software. All such software maintenance activity is performed by the computer services provider 165 from its remote location without action by the user.

Referring back to FIG. 1, as set forth above, the user 105 accesses the services of the computer services provider 165 via the Internet 120 and the remote web server 140. It should be understood that the computer services provider 165 may take the form of an application services provider that provides to users the functionality of each of the remote components and functionality described herein. Alternatively, the computer services provider 165 may be resident at a terminal server 160 as illustrated in FIG. 1 and the functionality of the other components of the system illustrated, including the web server 140, additional terminal servers 170, 180, the domain controller 130, and the file server 150 may be operated by other organizations or companies under the direction of or with access by the computer services provider 165.

Alternatively, the networked computing environment, illustrated in FIG. 1, may be in the form of an intranet utilized by an organization such as a company or educational institution that finds it necessary to have an intra-organization networked computing environment. In that case, the components of the networked computing environment 100 may be maintained within a single organization, and the user will obtain the functionality of the components of the networked computing environment via an intranet as opposed to the Internet 120. For purposes of the following description of the exemplary embodiments of the present invention, Internet and intranet are used interchangeably to describe the method and system by which users access the functionality and components of the networked computing environment 100 whether that functionality and those components are operated by a remote third party computer services provider 165 or whether those components are operated and those services are provided by a system administrator resident at an organization to which the user belongs.

The Internet 120 is well understood by those skilled in the art as a world wide collection of networks and gateways through which individuals and organizations may communicate and transfer back and forth data, software, and information. As should be understood by those skilled in the art, the functionality of the Internet 120 illustrated in FIG. 1 may also be provided by an intranet in an organization or educational institution, for example, utilizing the functionality of the present invention via an intra-organizational intranet. An intranet, in the case of intra-organization networks, is also well known to those skilled in the art and includes, for example private networks based on Internet protocols, but designed for information management within the company organization. It should also be understood, that an intranet of an organization of any size may operate as the user 105 of the present invention where services provided to the intranet of that organization are ultimately provided from remote terminal services according to the present invention and via the Internet 120 as illustrated in FIG. 1.

In the case of Internet-based operation of an exemplary embodiment of the present invention, user access to the on-line services of the computer services provider 165 is made through the web server 140. The user 105 communicates with the computer services provider 165 through an Internet browser program 37 maintained on the user's computer 20. The web server 140 contains software that uses Internet-based protocols, such as hypertext transfer protocol (HTTP), to serve documents and associated files and software scripts to the user when requested by the user via the user's web browser. Exemplary web server software includes Internet Information Server (ISS) manufactured by Microsoft Corporation of Redmond, Wash., which utilizes hypertext transfer protocol to deliver World Wide web documents and information between the user 105 and remote users or organizations such as the computer services provider 165 through the web server 140.

Once a terminal server session is established between the user 105 and the computer services provider 165 via the networked computing environment 100, all user files, data and user profiles are stored and secured on the file server 150 under the control of the domain controller 130, described below, at the direction of the computer services provider 165. According to an exemplary embodiment, user profiles include the user's desired desktop configuration, described above, the user's authorities and permissions for access to the services of the computer services provider 165 and information on the types of services subscribed to by the user. That is, the profiles contain information as to the number and types of software applications 36, 172, 174 subscribed to by the user, electronic mail and messaging services subscribed to by the user, and the amount of data storage subscribed to by the user.

In the case of data storage, in accordance with an exemplary embodiment of the present invention, the user may select a particular amount of memory capacity for data and file storage through the computer services provider 165. This is advantageous because the user need only subscribe to the amount of memory capacity for data and file storage at the file server 150 as is necessary according to the user's individual or company needs. Alternatively, as the user 105 fills or begins to fill all the subscribed memory capacity at the file server 150, the user 105 may contact the computer services provider 165 to obtain additional memory capacity. In so doing, the user 105 avoids the necessity of upgrading the memory capacity of the user's personal computer 20 or in the case of a company or other organization, the company or organization eliminates the need for wide-scale upgrades in the memory capacity of their individual computing machines. Referring to FIG. 1, according to a preferred embodiment of the present invention, data and files are stored in the file server 150 in a hierarchical folder structure. One root folder 151 contains data folders 152, 154 for hosted companies and hosted individuals while another root folder 157 contains user profiles 158 for individual and company users.

The networked computing environment 100 includes a number of terminal servers 160, 170, 180, as described above. The terminal servers contain the software and administrative functionality of the computer services provider 165 and contain the software applications 172, 174 to which the user 105 has access via the networked computing environment 100. It should be understood by those skilled in the art that the number of terminal servers 160, 170, 180 is determined by the number of concurrent users 105 and/or the number of servers dedicated to particular applications. That is, the larger the number of users and the more numerous and complex the numbers and types of software applications and functionality provided to the users 105, the more terminal servers 160, 170, 180 will be required for the efficient operation of the networked computing environment.

As manufacturers of given software applications 172, 174 change versions of those given software applications, or upgrade those applications with corrective software modules, often known as "patches", the computer services provider 165, according to an exemplary embodiment of the present invention, makes all changes to software applications contained on the terminal servers 160, 170, 180 utilized by the computer services provider 165 for its users 105. The users 105 are not required to make changes or upgrades to the software applications on their individual computers 20. For example, if a new version of a popular word processing application is published and distributed by the manufacturer of the word processing application, the computer services provider 165 obtains the latest version of the word processing application and installs that version on one of the terminal servers 160, 170, 180. The next time the user 105 logs onto the services of the computer services provider 165 and opens the word processing application contained in one of the terminal servers 160, 170, 180, the user will be presented with the latest version or updated version of the word processing software application. If desired, the computer services provider 165 may issue advanced notices to users 105 of coming version changes and corrections to given software applications.

Terminal servers such as the terminal servers 160, 170, 180 may be clustered into groups along technology or services lines. For example, one cluster of terminal servers 160, 170, 180 may contain a full suite of software applications 172, 174 directed to desktop computing operations such as word processing, spreadsheet, database, desktop publishing, web page design, and like. Other clusters of terminal servers 160, 170, 180 may include, for example, complex database management software for querying, updating and managing relational databases. Other clusters of terminal servers may include sets of industry specific customized software applications, for example, software applications directed to accounting systems, medical systems, legal systems, etc.

According to an exemplary embodiment of the present invention, a terminal services connection management system is used for balancing the demands of users on individual terminal servers 160, 170, 180 and on clusters of terminal servers. One aspect of terminal services connection management is the management of connection of individual and company users to particular terminal servers containing software and services utilized by the users 105. Management of the connection between the users and the terminal servers includes transparently reconnecting users to original terminal servers hosting software applications and services utilized by the user in a previous terminal server session. For example, if the user 105 is utilizing a word processing application resident on the terminal server 160, the terminal services connection management functionality attempts to reconnect the user 105 to the terminal server 160 in a subsequent terminal server session.

Alternatively, if at the time the user 105 logs onto the networked computing environment 100, the terminal server 160 has no capacity to connect to the user 105, the terminal services connection management functionality may connect the user 105 to a separate terminal server 170 that contains the application or functionality desired by the user 105. It is advantageous to have multiple terminal servers logically grouped into a terminal server cluster, as described above, between which a given user 105 may be routed for desired services by the terminal services connection management functionality. As described below, the terminal services connection management functionality is preferably contained in and operated by the domain controller server 130.

Electronic mail and messaging services are provided to the users 105 of the networked computing environment 100 through a variety of sources. For example, electronic mail and messaging services may be provided by the computer services provider 165 or the source for electronic mail and messaging services may be established within a given organization. A number of electronic mail systems may be supported and provided to the users 105 via the networked computing environment 100. Exemplary electronic mail systems include Post Office Protocol 3 (POP3) that is a standard in common use on TCP/IP networks, and Internet Message Access Protocol (IMAP) that is a method for an electronic mail program to gain access to electronic mail and bulletin board type messages stored on mail servers. Such electronic mail systems are well known to those skilled in the art.

According to an exemplary embodiment, balancing the use load on the various servers, such as the file server 150 and the terminal servers 160, 170, 180 may be performed by a load balancing software application 175 to ensure the networked computing environment 100 operates in an efficient manner. For example, if terminal servers 160, 170, 180 are clustered together to maintain and operate a suite of software applications directed to desktop computing, as described above, the load balancing application 175 may ensure a proper balance of use between the terminal servers in that cluster.

In an exemplary embodiment, the load balancing application 175 may be resident on a terminal server 170 as illustrated in FIG. 1. Alternatively, the load balancing application 175 may be resident on another component of the networked computing environment 100, such as the domain controller 130. The load balancing application 175 may be developed and implemented by the computer services provider 165 for balancing use of services provided by the computer services provider 165. Alternatively, the load balancing application 175 may be developed and/or implemented by an application service provider or Internet service provider through which the computer services provider 165 operates. It should be understood that load balancing may be accomplished through a variety of software and/or hardware solutions that ensure efficient use of services available through the networked computing environment 100.

As users 105 utilize software applications from terminal servers, such as the terminal server 160, users may be reconnected to a particular terminal server after the users have disconnected from that terminal server from a previous session. Where load balancing requires that a user be connected to a different terminal server containing the same software applications as desired by the user, the user may be transferred by the load balancing application 175 transparently to the separate terminal server 170 as management of the terminal servers requires. According to an exemplary embodiment of the present invention, the interaction of the components and functionality of the networked computing environment 100 of the present invention may be managed by the domain controller(s) 130. It should be understood that a number of domain controllers 130 may be used as necessary for the efficient operation of the networked computing environment 100. The domain controller 130 may also be responsible for maintaining the directory services and security for the backend of the networked computing environment 100 which includes all the server components and functionality accessible by users 105.

The domain controller 130 may be set up as two or more domain controllers to provide redundancy in the event that one domain controller fails. It should be understood that the number of domain controllers may be increased to improve performance and accommodate larger scale systems. Additionally, management functions of the domain controller 130 may be split between multiple domain controllers. In order to maintain security of the networked computing environment 100, the domain controller 130 operates a "lockeddown" state of the terminal servers 160, 170, 180. That is, users may only run a restricted set of executable files and dynamic link libraries (DLLs). Users have access to only their profile data and file data contained in the file server 150. Users may not browse the backend of the networked computing environment 100 in any manner or prevent access to the profiles and data of other users. The domain controller 130 may also be used to prevent the viewing of the actual locations of data files or the gaining of knowledge of others using the system regarding the locations or contents of data files. The security and privacy of the backend of the networked computing operating environment which includes the domain controller 130, the web server 140, the file server 150, and the terminal servers 160, 170, 180, is accomplished through a directory services system 135 operated by the domain controller 130.

A directory services system 135 operated by the domain controller 130, such as Active Directory, manufactured by Microsoft Corporation of Redmond, Wash., provides for tracking of network-based entities such as applications, files, devices (printers, etc.), and users. The directory services system acts as a switchboard of the network operating system to oversee the transfer of data to and from users and between components such as the file server 150 and the terminal servers 160, 170, 180. The directory services system maintained and operated by the domain controller 130 establishes and controls the relationships between the distributed resources including the users, their data, and applications utilized by the users to enable these resources to work together securely and efficiently.

Additionally, as described below, the directory services system of the domain controller 130 allows users 105 with a single sign-on to the networked computing environment 100 and provides system administrators of the computer services provider 165 or of organizations in a intranet-based networked computing environment to manage security services for internal desktop users, remote dial-up users, and external e-commerce customers.

Referring back to FIG. 1, the directory services system 135 of the domain controller 130 organizes and stores information on the various users 105 of the networked computing environment 100 in a hierarchical object-oriented fashion. That is, the domain controller 130 through its use of directory services uses objects to represent network resources such as users, groups of users, machines, devices, and software applications. As is well known to those skilled in the art, objects may be any data or module comprised of computer software routines that may be treated as a discrete entity.

As shown in FIG. 1, the directory services system 135 of the domain controller 130 uses containers to represent users and/or organizations, such as user 152 and organization 154, or collections of related objects under the container devices such as data 158 under the root folder or container 157. The information is organized in a tree structure made up of these objects in containers, similar to the way that some operating systems use folders and files to organize information on a computer. According to a preferred embodiment, the directory services system 135 is structured according to two types of organizational units (OU), service and business. For example, several related software applications 172, 174 may be nested under a service organizational unit 171. This structure allows several client users to use the same applications under the applications service organizational unit. Under business organizational units, each user or organization has an organizational unit, such as users 106, 107 under business organizational unit 152.

The directory services system 135 of the domain controller 130 stores information about the network elements in the form of objects. These objects can be assigned attributes that describe specific characteristics about the object. Accordingly, a wide range of information may be stored in the directory of the domain controller 130 to tightly control access to individual objects. For example, each of the software applications 172, 174 resident on the terminal server 170 may be stored as objects of that terminal server 170. By maintaining specific information in the directory services of the domain controller 130 as to which software applications a particular user has subscribed to for use, the domain controller 130 can manage access to the software applications requested by and used by the user 105. Accordingly, attributes assigned to a given software application object of the applications containers in the terminal server 170 might include the user's name, address, and information regarding the user's subscription to that software application, such as number of copies the user may use and the duration of the user's subscription period.

To provide security for the networked computing environment 100, the directory services system 135 of the domain controller 130 provide a single sign-on to the networked computing environment 100 and by locking-down desktop configurations of individual users and preventing access to user machine operations such as software installation or registry editing of software applications and registries maintained on remote terminal servers, such as terminal servers 160, 170, 180. The directory services system 135 of the domain controller also sets access control privileges on directory objects throughout the backend of the networked computing environment 100 so that individual users or groups of users may only have access to specific objects including data, software applications, etc., to which those users or groups of users have subscribed access and use. Security of data maintained in the file server 150 is maintained by the directory services system 135 of the domain controller 130 by governing authentication of user identity in controlling access to network resources such as the file server 150 and the terminal servers 160, 170, 180.

Once a user is authenticated and logged onto the networked computing environment 100 all resources of the system are protected and access is granted or denied based on the user's specific authorizations to utilize specific components and functionality contained therein. According to a preferred embodiment, the directory services system 135 of the domain controller 130 may allow users and organizations to securely extend selected directory information including file information and data beyond their organization or secured files to extranet users and e-commerce customers to allow those users and customers access to selected data and software.

It should be understood by those skilled in the art that the networked computing environment 100 may be operated by a given application service provider or Internet service provider or other computer services provider 165. Accordingly, management of the networked computing environment 100 is performed by system administrators of such organizations through management of the directory services system 135 of the domain controller 130. Alternatively, a number of computer services providers 165 may be resident in a single networked computing environment controlled by a larger computer services provider 165. That is, a number of computer services providers may be nested within the networked computing environment 100 to provide services to their users 105 through a larger computer services provider that manages the services, functionality and security of the system through the domain controller 130.

As described above, after a user or group of users have subscribed to the services of a given computer services provider 165, the users or groups of users may log onto a networked computing environment 100 for access to those services. FIG. 5 illustrates an operational flow of the steps performed by the system of the present invention in connecting a user to the networked computing environment 100 and in providing computing services to users and groups of users in a distributed networked computing environment.

The operational flow of steps begins at step 500 and moves to step 505 where the user logs onto the networked computing environment 100 by requesting access to the services of the user's computer services provider 165 through the Internet-based web page of the computer services provider 165. At step 510, the user's logon request is forwarded to the domain controller 130 for authentication. At step 515, the domain controller queries the user for logon information. As should be understood to those skilled in the art, the logon information may contain a number of different types of information designed to properly authenticate the user including a password, a user identification number, address information, private codes, etc. At step 520, the user provides the required authentication information and, at step 525, the domain controller authenticates the user and opens a connection between the user and the computer services provider 165 as a single-logon procedure managed by the domain controller 130 through its directory services system 135 functionality.

At step 530, the computer services provider 165 returns on-line a computing services web page to the user 105. The on-line services web page installs from the terminal server 160 of the computer services provider 165 an ActiveX control onto the user's computer 20. As described above, the ActiveX control installs onto the user's computer 20 and provides an emulation of the desired operating system and provides the user access to the computer services provider 165 for the user's desktop profile, software applications and data.

At step 540, the computer services provider 165 requests logon information from the user. It should be understood that the logon to the computer services provider 165 is separate from the logon to the networked computing environment 100, when the computer services provider 165 is one of a number of computer services providers operating on the networked computing environment 100. However, if the computer services provider 165 is the only services provider on the networked computing environment 100, a single logon and authentication procedure may be used to log directly onto the services of the computer services provider 165 through the domain controller 130.

At step 545, the user provides logon information to the computer services provider 165. At step 550, the computer services provider 165 queries the domain controller for information on the user to properly authenticate the user by matching the information provided by the user 105 to information maintained by the domain controller 130.

After the user has been properly authenticated as having access to the services of the computer services provider 165, the domain controller 130 begins management of the services to be provided to the user 105 by determining whether the user has previously disconnected from a terminal server session. If so, the user 105 is reconnected to the same terminal server 160, 170, 180 so that the user's utilization of services of the computer services provider 165 are transparent to the user upon log on. Reconnection of the user to the previously connected terminal server is directed by the load balancing application 175, as described above. If for the sake of load balancing it is necessary to direct the user to the desired functionality maintained at a separate terminal server 180, the load balancing application 175 may do so to efficiently manage the network resources. Accordingly, if at step 555 the user has been previously disconnected from a terminal server session, the user may be reconnected to the terminal server in use at step 560 if efficient load balancing allows.

If at step 555, the user 105 has not been disconnected or has not disconnected from a previous terminal server session of the computer services provider 165, logon continues at step 565, and the user is passed to the terminal server of the computer services provider 165 for provision to the user of the user's desktop profile and for connection of the user to desired data and application functionality. It should be understood that where the user has not disconnected from a previously in-use terminal server, the user will be redirected to an appropriate terminal server for provision to the user of desired software application functionality and data in a way that efficiently balances utilization of the network resources. That is, the load balancing application 175 will assign the user to a given terminal server 160, 170, 180 containing the desired functionality and data, but that also has utilization capacity for the user 105.

At step 575, the computer services provider 165 opens a dialog with the user's computer 20 through the ActiveX control 110 so as to provide the user with the user's desktop profile and data and software applications. At step 580, the computer services provider 165 queries the file server 150 for the user's profiles and desktop configuration. Once the user is provided with the user's desktop profile, the user's desktop will be displayed on the user's computer as described above with reference to FIG. 3. That is, the user's desktop will be displayed in the exact configuration set by the user and desired by the user. Regardless of the location of the user or even the computer utilized by the user, so long as the computer is compatible with the technology of the computer services provider, the desktop of the user will appear the same giving the user a satisfying and transparent user experience from any remote location. Likewise, all software applications subscribed to by the user and all data files maintained by the user will be accessible through the user's desktop from any remote location from which the user logs on.

At step 585, the domain controller 130 through its directory services system 135 establishes paths to the user's files, data, applications and electronic mail and messaging services for use by the user 105. At step 590, the domain controller secures and maintains the components and resources of the networked computing environment 100 from unauthorized access and/or use by the user 105.

As described herein The present invention provides user access to software applications, data storage and retrieval, and electronic mail and messaging services in a networked computing environment via the Internet or via an intranet. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of providing computing services in a networked computing environment, comprising:

providing a computing device a software module from a remote computing device for allowing exchange of data between the computing device and the remote computing device;

providing the computing device, through the software module, an emulation of an operating system of the remote computing device;

providing the computing device, through the software module, an emulation of the computing device's desktop configuration, the desktop configuration being passed to the computing device from the remote computing device;

monitoring actions at the computing device by the operating system of the remote computing device;

in response to the actions at the computing device, updating the emulation of the operating system provided to the computing device;

in response to the actions at the computing device, updating the emulation of the desktop configuration provided to the computing device;

receiving, at a file server, data from the computing device; storing, performed by the file server, the data received at the computing device at the remote computing device; and maintaining a profile comprising personal information, a desktop configuration, at least one application authorized for use at the remote computing device, and an amount of data storage on the file server allocated to the profile.

2. The method of claim 1, prior to providing a computing device a software module from a remote computing device, further comprising connecting a computing device to a remote computing device via a networked computing environment.

3. The method of claim 2, wherein connecting a computing device to a remote computing device via a networked computing environment, further comprises connecting the computing device to the remote computing device via the Internet.

4. The method of claim 2, wherein connecting a computing device to a remote computing device via a networked computing environment further comprises authenticating authority for the computing device to connect to the remote computing device.

5. The method of claim 1, wherein providing a computing device a software module from a remote computing device, further comprises providing the computing device a web page from the remote computing device, the web page having the software module embedded therein.

6. The method of claim 5, wherein the remote computing device includes a web server, and wherein providing the computing device a web page includes providing the web page through the web server.

7. The method of claim 5, wherein the software module is an ActiveX control.

8. The method of claim 1, wherein the actions at the computing device include keyboard strokes, mouse movements, and mouse clicks.

9. The method of claim 1, further comprising providing the computing device use of a software application, the software application being resident on the remote computing device.

10. The method of claim 9, wherein providing the computing device use of a software application further comprises:
providing a plurality of software applications subscribed to for use by the computing device; and
providing changes to the plurality of software applications at the remote computing device.

11. The method of claim 10, wherein the remote computing device includes a terminal server, and wherein providing the computing device use of a software application, further comprises providing the software module and the software application through the terminal server.

12. The method of claim 1, further comprising:
receiving data from the computing device;
storing the data received from the computing device on the remote computing device;
storing authentication information and the desktop configuration on the remote computing device; and
retrieving the data from the remote computing device for use by the computing device.

13. The method of claim 1, wherein the remote computing device includes a domain controller and managing access to the remote computing device and securing the remote computing device from unauthorized access is performed by the domain controller.

14. The method of claim 1, wherein the remote computing device includes a plurality of computing devices, and wherein the method of claim 1 further comprises:
determining whether the computing device has previously been connected to one of the plurality of remote computing devices; and
if so, then connecting a computing device to a remote computing device includes reconnecting the computing device to the one of the plurality of remote computing devices.

15. A method of providing computing services in a networked computing environment, comprising:
connecting a plurality of computing devices to a remote terminal server via a networked computing environment;
authenticating authority for each computing device to connect to the remote terminal server;
providing each computing device a software module from the terminal server for allowing exchange of data between the computing device and the remote terminal server;
providing each computing device, through the software module, an emulation of an operating system of the remote terminal server;
providing each computing device, through the software module, an emulation of the computing device's desktop configuration, the desktop configuration being passed to the computing device from the remote terminal server;
monitoring actions at each computing device by the operating system of the remote terminal server;
in response to the actions at each computing device, updating the emulation of the operating system provided to the computing device;
in response to the actions at each computing device, updating the emulation of the desktop configuration provided to the computing device;
providing each computing device use of a software application, the software application being resident on the remote terminal server;
receiving, at a file server, data from the computing device;
storing, performed by the file server, the data received at the computing device at the remote computing device; and
maintaining a profile for each computing device comprising personal information, a desktop configuration, at least one application authorized for use at the remote computing device, and an amount of data storage on the file server allocated to the profile.

16. The method of claim 15, wherein providing each computing device use of a software application further comprises:
providing a plurality of software applications subscribed to for use by each computing device; and
providing changes to the plurality of software applications at the remote terminal server.

17. A computer readable medium having stored thereon computer-executable instructions which when executed by a computer, performs:
providing a computing device a software module from a remote computing device for allowing exchange of data between the computing device and the remote computing device;
providing the computing device, through the software module, an emulation of an operating system of the remote computing device;
providing the computing device, through the software module, an emulation of the computing device's desktop configuration, the desktop configuration being passed to the computing device from the remote computing device;
monitoring actions at the computing device by the operating system of the remote computing device;

in response to the actions at the computing device, updating the emulation of the operating system provided to the computing device;

in response to the actions at the computing device, updating the emulation of the desktop configuration provided to the computing device;

receiving, at a file server, data from the computing device;

storing, performed by the file server, the data received at the computing device at the remote computing device; and maintaining a profile comprising personal information, a desktop configuration, at least one application authorized for use at the remote computing device, and an amount of data storage on the file server allocated to the profile.

18. The computer readable medium of claim 17 having stored thereon computer-executable instructions which when executed by a computer, prior to providing a computing device a software module from a remote computing device for allowing exchange of data between the computing device and the remote computing device, further performs:

connecting a computing device to a remote computing device via a networked computing environment;

authenticating authority for the computing device to connect to the remote computing device; and providing the computing device a web page from the remote computing device, the web page having the software module embedded therein, whereby the software module is an ActiveX control.

19. The computer readable medium of claim 17 having stored thereon computer-executable instructions which when executed by a computer, further performs:

providing the computing device use of a software application, the software application being resident on the remote computing device; and providing changes to the software application at the remote computing device.

20. The computer readable medium of claim 17 having stored thereon computer-executable instructions which when executed by a computer, further performs:

receiving data from the computing device;

storing the data received from the computing device at the remote computing device;

storing authentication information and the desktop configuration at the remote computing device; and retrieving the data from the remote computing device for use by the computing device.

* * * * *